Patented June 23, 1942

2,287,141

UNITED STATES PATENT OFFICE 2,287,141

LIQUID DIRT SOLVENT FOR EGGS AND PROCESS FOR APPLYING SAME

Ralph Webb Schofield, Vashon, Wash.

No Drawing. Application December 8, 1939, Serial No. 308,198

12 Claims. (Cl. 99—113)

This invention relates to the art of cleaning eggs and a liquid dirt solvent used therein, and particularly to the cleaning of eggs generally termed in the art as "dirty" eggs.

Eggs as commercially obtained, which are "dirty," are most commonly soiled by one or more of the following: egg yolk from broken eggs, blood from the hens, straw stains, and so-called "yard dirt," which is a combination of soil and manure. A very substantial proportion of all eggs produced commercially are in some manner "dirty" unless they are immediately removed from the nests, which is generally impracticable. For example, the eggs may become soiled from yard dirt by the hens' feet or bills, or they may become soiled with egg yolk by broken eggs either in the hen-house or in the handling of the eggs.

The problem of "dirty" eggs is one which has long taxed the skill and ingenuity of the egg producer, as so-called "dirty" eggs sell on the market at a price very substantially under the price of clean eggs. This margin or difference between the price of clean eggs and "dirty" eggs has varied from approximately 4¢ to 16¢ per dozen, according to market conditions. In view of the very substantial reduction existing in price range because of "dirty" eggs, many methods have been tried for the cleaning of eggs. At the present time, many eggs are cleaned by abrasive materials, such as sandpaper, emery cloth, or steel wool. Most visible dirt on the surface of the eggs may be removed this way. However, the abrasive material also tends to remove the "bloom" from the eggs, so that the eggs lose their natural "chalky" appearance. While cleaning by this method will somewhat increase the price, still the eggs will not be graded as of the same quality as clean untreated eggs because of the change in natural appearance.

Also the prior art has attempted to soak eggs in a cleaning solution. However, egg shells are porous and many very minute pores are present. The moisture or liquid from the cleaning solution passes through these minute pores, and may be sufficient to cause a contamination in the taste of the egg. Also foreign materials entering the egg will adversely affect the keeping qualities of the egg. Also if an egg is soaked in a cleaning solution, the egg shell takes on the appearance of what is commonly known in the art as a "washed" egg. This "washed" egg appearance may be described as removal of the "chalky" dull appearance of an uncleaned egg and the substitution therefor of a shiny and somewhat glistening appearance.

The prior art has also attempted to use liquid cleaners for removing the dirt but these cleaners have removed the "bloom" and "chalky" appearance and have provided eggs which are streaked, indicating that they have been cleaned, which eggs are generally termed in the art as "mussy" eggs.

Regardless of whether an egg is white, brown or buff in natural color, the egg in its natural state provides a "chalky" appearance which "chalky" appearance is removed by either the abrasive process or the washing processes above described.

It is an object of my invention to provide a dirt solvent which is effective in removal of the stains or dirt commonly encountered in the commercial egg producing industry, and to provide a method whereby this solvent may be most efficiently utilized, all without the removal of the desired "chalky" appearance of the egg or the "bloom" of the egg. The "bloom" of an egg may be described as a thin film of a mucous-like secretion, which is naturally present on eggs. This "bloom" has a natural appearance which purchasers intentionally or unintentionally often look for in determining whether they are obtaining normal fresh eggs. In other words, the public has become trained to expect the "chalky" appearance on the best grade of eggs which will indicate that the "bloom" has not been destroyed by washing or abrasive materials and that the otherwise "chalky" appearance of a natural egg has not been changed.

It is a further object of this invention to provide a method and means whereby dirt may be readily, rapidly and efficiently removed from eggs, so that in practice the egg producer may remove the dirt in as short a period of time as possible after the egg has become contaminated by the dirt. In this connection I have discovered that the dirt on eggs facilitates or is generally present with the development and growth of bacteria, and the longer the dirt remains on the egg the greater the possibility of bacterial contamination on the egg shell, which will pass through the pores of the egg shell and contaminate the egg.

It is an object of this invention to provide a method and dirt solvent for use therein, so that all eggs, whether dirty or clean in the now commonly accepted commercial sense, may be subjected to the cleaning process which will not adversely affect the eggs so far as their appearance is concerned, but which at the same time will positively remove feeding material for bacteria on the egg shell.

The foregoing objects of this invention are obtained by the method and product hereinafter set forth which are preferred forms of embodiment of this invention. I find that a preferred liquid dirt solvent for use in cleaning eggs may be prepared as follows:

| | Parts |
|---|---|
| Glacial acetic acid (99.5% pure) | 95. |
| Pure food color | .5 |
| Methyl salicylate | 1. |
| Ethyl alcohol (95% pure) | 9. |
| Water | 894.5 |
| Total | 1000.0 |

The liquid dirt solvent made in accordance with the foregoing formula may be prepared by dissolving the methyl salicylate in the ethyl alcohol, and then mixing with such solution the glacial acetic acid, water and pure food coloring.

I find that the glacial acetic acid should be within the range of 9.3 to 9.7% to give the most desirable results. If the solution contains a greater percentage of glacial acetic acid, I find that the surface of the eggs will remain somewhat sticky or gummy, and on the other hand if a lesser percentage of the glacial acetic acid is used, the utility of the solvent is substantially proportionately reduced thereby. The primary cleaning agent used in this formula will be the acid.

The ethyl alcohol has been incorporated in the dirt solvent for two purposes: (1) to increase the volatility of the entire product, and (2) to serve as a solvent for the methyl salicylate. Methyl salicylate is preferably added as a deodorant to counteract the odor of the glacial acetic acid.

The pure food coloring is preferably added as a coloring material for the solution, but the same does not affect the coloring of the eggs when used properly. Also it tends to prevent improper use of the solvent as it prevents immersing and washing of eggs, as eggs so treated will absorb the color.

After a dirt solvent has been prepared in accordance with the above formula, it is applied to the eggs by wetting a portion of a rubbing member, as a turkish towel, and the dirt spot is rubbed off the egg. The action seems to be a physical-chemical reaction, and the dirt is dissolved into the solution in the towel and the dirt left in the towel as a stain. As distinguished from this mode of operation, I find ordinary cleaners as ether and carbon-tetrachloride dissolve the dirt in a purely physical manner, and the dissolved dirt is wiped off by the towel. However, with such cleaners part of the dirt is left on the egg and the egg assumes a "mussy" or streaky appearance. I find that in practical operation very little rubbing action is necessary with a cloth dampened by my dirt solvent, and the dirt will be dissolved into the solution on the cloth.

Eggs cleaned by my process have been found to have enhanced keeping qualities over uncleaned eggs or eggs cleaned by other commercial processes. Eggs, which have been cleaned in accordance with my invention, have kept for several weeks without the appearance of rot showing in the egg contents. On the other hand, uncleaned eggs, some dirty and some apparently clean, were subjected to the same temperature and moisture conditions, and it was found that eggs treated according to my invention kept better than the uncleaned eggs.

Probably the reason for the enhanced keeping qualities of the eggs treated according to my invention, is that by the removal of the dirt I have also removed the feeding material which will attract and/or permit development of the bacteria on the egg shell, which will pass from there through the pores into the egg. Also it would seem that I have removed microscopic dirt as well as visible dirt, in view of the fact that eggs treated in accordance with my invention have enhanced keeping qualities over apparently clean untreated eggs. Experts have examined eggs cleaned in accordance with my invention and were not able to ascertain any appreciable difference in appearance between such eggs and naturally clean eggs.

RANGE OF PROPORTIONS AND EQUIVALENTS

*Acids*

Preferably the acid to be used is acetic acid. Also preferably the source thereof is glacial acetic acid of 99.5% purity due to the fact that commercial glacial acetic acid of this purity commonly obtained on the market eliminates the presence of other impurities. However, if a weaker acetic acid is used, greater quantities thereof must be provided so that the percent strength of the final product can be properly maintained. I find that the range to provide optimum results is 9.3% to 9.7% actic acid in the final product.

Also butyric acid, which also includes as used herein iso-butyric acid, an isomer, may be employed in my invention. If butyric acid is used, I find that the percent strength of the final product is 9.5% to 9.8% to obtain optimum results. I find that this acid provides the desired cleaning action, but it is less preferable due to the normal odor inherent in butyric acid.

Also formic acid may be employed in my invention. If formic acid is used, I find the percent strength of the final product to provide optimum results should be 9.1% to 9.7% strength formic acid in the final product. I find that a dirt solvent made with formic acid as just defined has the desired cleaning action, but is less desirable in that it has a tendency to somewhat remove the egg "bloom," and thus somewhat adversely affects the appearance.

If a combination of the acids mentioned is used, i. e., any two or three thereof, I find that the strength thereof to provide optimum results should be 9.3% to 9.6% acid in the final product.

The foregoing acids are of the group commonly referred to as "fruit" acids. These acids are the basis of many of our fruits and are to be found in fruit juices, which I believe is the reason why these acids are termed "fruit" acids. Other fruit acids, which will function in my dirt solvent for cleaning eggs, are citric acid, oxalic acid, tartaric acid. These acids are less desirable for various reasons than the aforementioned acetic acid, butyric acid, and formic acid, but the same will operatively function in my dirt solvent for cleaning eggs. The percent strength of the final product of such acids will vary from 9.1% to 15.0%.

*Ethyl alcohol*

I find for optimum results that the ethyl alcohol should constitute substantially 0.9% of the final product. I find that it is not necessary to use more than this strength to provide the desired volatility, and that under this strength the appearance of the eggs is adversely affected. In other words, the eggs appear somewhat streaky or "mussy."

Methyl salicylate

This is the source of commercial wintergreen flavoring and other flavorings may be used. The strength to be used will depend upon the extent of deodorization desired. For practical purposes I have found that the final product should include methyl salicylate of approximately 0.1%.

Pure food coloring

It has been found in practice that the product is more desirable when colored. The coloring does not impart color to the egg when used in accordance with this invention. Also the coloring will prevent the improper use of the product by immersing and washing eggs, because in so doing the eggs would assume such color.

Process of applying

I find that my liquid dirt solvent for cleaning eggs may be applied to a brush (preferably a soft brush), a cloth, a sponge, or other soft moisture retaining rubbing means. Preferably I find that a cloth in the nature of Turkish toweling should be used. The material, as the cloth, is dampened with the liquid solvent. The so dampened cloth is rubbed back and forth over the egg until all the dirt spots are removed. A physical-chemical reaction results and the dirt is dissolved into the solution on the cloth and the dirt left therein as a stain. It has been found that very little rubbing is necessary to remove the dirt or stain commonly encountered on eggs as they are commercially produced.

Obviously, changes may be made in the process and product of my invention, without departing from the principle thereof, the above setting forth only preferred forms of embodiment.

I claim:

1. An egg cleaning dirt solvent comprising an aqueous solution containing by volume acetic acid which has been derived from glacial acetic acid in a strength of 9.3% to 9.7%; and ethyl alcohol.

2. An egg cleaning liquid dirt solvent comprising an aqueous solution containing by volume a fruit acid which has been derived from chemically pure fruit acid in a strength of 9.1% to 15%; and ethyl alcohol.

3. An egg cleaning liquid dirt solvent comprising an aqueous solution containing by volume butyric acid which has been derived from glacial butyric acid in a strength of 9.5% to 9.8%; and ethyl alcohol.

4. An egg cleaning liquid dirt solvent comprising an aqueous solution containing by volume formic acid which has been derived from glacial formic acid in a strength of 9.1% to 9.7%; and ethyl alcohol.

5. An egg cleaning liquid dirt solvent comprising an aqueous solution containing by volume a fruit acid which has been derived from chemically pure fruit acid in a strength of 9.1% to 15%; and ethyl alcohol substantially 0.9% by volume.

6. An egg cleaning liquid dirt solvent comprising an aqueous solution containing by volume acetic acid which has been derived from glacial acetic acid in a strength of 9.3% to 9.7%; and ethyl alcohol substantially 0.9%.

7. The method of cleaning eggs comprising wetting a rubbing means with a liquid dirt solvent comprising an aqueous solution containing by volume acetic acid which has been derived from glacial acetic acid in a strength of 9.3% to 9.7% and ethyl alcohol; and rubbing an egg with said rubbing means to dissolve the dirt from the egg by a physical-chemical reaction so that the dirt is dissolved in the solution and left in the rubbing means as a stain.

8. The method of cleaning eggs comprising wetting a rubbing means with a liquid dirt solvent comprising an aqueous solution containing by volume a fruit acid which has been derived from chemically pure fruit acid in a strength of 9.1% to 15% and ethyl alcohol; and rubbing an egg with said rubbing means to dissolve the dirt from the egg by a physical-chemical reaction so that the dirt is dissolved in the solution and left in the rubbing means as a stain.

9. The method of cleaning eggs comprising wetting a rubbing means with a liquid dirt solvent comprising an aqueous solution containing by volume butyric acid which has been derived from glacial butyric acid in a strength of 9.5% to 9.8% and ethyl alcohol; and rubbing an egg with said rubbing means to dissolve the dirt from the egg by a physical-chemical reaction so that the dirt is dissolved in the solution and left in the rubbing means as a stain.

10. The method of cleaning eggs comprising wetting a rubbing means with a liquid dirt solvent comprising an aqueous solution containing by volume formic acid which has been derived from glacial formic acid in a strength of 9.1% to 9.7% and ethyl alcohol; and rubbing an egg with said rubbing means to dissolve the dirt from the egg by a physical-chemical reaction so that the dirt is dissolved in the solution and left in the rubbing means as a stain.

11. The method of cleaning eggs comprising wetting a rubbing means with a liquid dirt solvent comprising an aqueous solution containing by volume a fruit acid which has been derived from chemically pure fruit acid in a strength of 9.1% to 15% and ethyl alcohol substantially 0.9% by volume; and rubbing an egg with said rubbing means to dissolve the dirt from the egg by a physical-chemical reaction so that the dirt is dissolved in the solution and left in the rubbing means as a stain.

12. The method of cleaning eggs comprising wetting a rubbing means with a liquid dirt solvent comprising an aqueous solution containing by volume acetic acid which has been derived from glacial acetic acid in a strength of 9.3% to 9.7%, and ethyl alcohol substantially 0.9% and rubbing an egg with said rubbing means to dissolve the dirt from the egg by a physical-chemical reaction so that the dirt is dissolved in the solution and left in the rubbing means as a stain.

RALPH WEBB SCHOFIELD.

CERTIFICATE OF CORRECTION.

Patent No. 2,287,141.

June 23, 1942.

RALPH WEBB SCHOFIELD.

It is hereby certified that error appears in the printed specification of the above numbered patent requiring correction as follows: Page 3, first column, line 44, claim 1, after "cleaning" insert --liquid--; and that the said Letters Patent should be read with this correction therein that the same may conform to the record of the case in the Patent Office.

Signed and sealed this 8th day of August, A. D. 1942.

(Seal)

Henry Van Arsdale,
Acting Commissioner of Patents.